(12) United States Patent
Kwon et al.

(10) Patent No.: US 11,485,220 B2
(45) Date of Patent: Nov. 1, 2022

(54) ROTARY-TYPE AUTOMOTIVE TRANSMISSION

(71) Applicant: SL Corporation, Daegu (KR)

(72) Inventors: Hyouk Kwon, Daegu (KR); Sungho Jin, Daegu (KR)

(73) Assignee: SL Corporation, Daegu (KR)

( * ) Notice: Subject to any disclaimer, the term of this patent is extended or adjusted under 35 U.S.C. 154(b) by 668 days.

(21) Appl. No.: 16/506,481

(22) Filed: Jul. 9, 2019

(65) Prior Publication Data

US 2020/0101832 A1 Apr. 2, 2020

(30) Foreign Application Priority Data

Sep. 28, 2018 (KR) .......................... 10-2018-0115811

(51) Int. Cl.
| | |
|---|---|
| *F16H 59/08* | (2006.01) |
| *F16H 61/24* | (2006.01) |
| *B60K 6/50* | (2007.10) |
| *B60K 26/04* | (2006.01) |

(52) U.S. Cl.
CPC ................ *B60K 6/50* (2013.01); *B60K 26/04* (2013.01); *F16H 59/08* (2013.01); *B60K 2370/126* (2019.05); *F16H 61/24* (2013.01); *F16H 2059/081* (2013.01)

(58) Field of Classification Search
CPC ............... F16H 59/08; F16H 2059/081; B60K 2370/126
See application file for complete search history.

(56) References Cited

U.S. PATENT DOCUMENTS

| | | | | |
|---|---|---|---|---|
| 2008/0115613 A1* | 5/2008 | Giefer | .................... | G05G 5/065 |
| | | | | 74/473.21 |
| 2009/0000407 A1* | 1/2009 | Meyer | ...................... | G05G 5/03 |
| | | | | 74/10.1 |
| 2015/0027861 A1* | 1/2015 | Hoskins | .................. | F16H 59/08 |
| | | | | 200/43.11 |
| 2015/0285351 A1* | 10/2015 | Rake | ....................... | F16H 27/06 |
| | | | | 74/436 |

(Continued)

FOREIGN PATENT DOCUMENTS

| | | |
|---|---|---|
| CN | 201541856 U | 8/2010 |
| CN | 202872046 U | 4/2013 |

(Continued)

OTHER PUBLICATIONS

Kang Guangming et al. "Rapid Entry for Body Repair," Lake Academic Press, Sep. 2015, 108-112, 110.

*Primary Examiner* — Victor L MacArthur
*Assistant Examiner* — Gregory T Prather
(74) *Attorney, Agent, or Firm* — United One Law Group LLC; Kongsik Kim; Jhongwoo Peck

(57) ABSTRACT

A rotary-type automotive transmission is provided. The rotary-type automotive transmission includes a housing; a shaft coupled to the housing in an axial direction; a bullet part provided on a surface of the shaft to be elastically projected in a first direction, which is perpendicular to the axial direction, and/or in a second direction, which is opposite to the first direction; and a groove part mounted in a receiving groove that is formed on a surface of the housing, to face the bullet part. The groove part slidably moves in the first direction and/or in the second direction to be received in the housing.

6 Claims, 10 Drawing Sheets

(56) References Cited

U.S. PATENT DOCUMENTS

2015/0369357 A1* 12/2015 Lee .................. F16H 63/42
  74/504
2015/0369358 A1* 12/2015 Lee .................. G05G 5/05
  74/507

FOREIGN PATENT DOCUMENTS

CN   104321713 A   1/2015
CN   206775880 U   12/2017

* cited by examiner

ROTARY-TYPE AUTOMOTIVE TRANSMISSION

CROSS-REFERENCE TO RELATED APPLICATION

This application claims priority to Korean Patent Application No. 10-2018-0115811, filed on Sep. 28, 2018 and all of the benefits accruing therefrom under 35 U.S.C. § 119, the disclosure of which is incorporated herein by reference in its entirety.

BACKGROUND

1. Technical Field

The present disclosure relates to a rotary-type automotive transmission, and more particularly, to a rotary-type automotive transmission which is capable of improving the assemblability of a transmission when groove parts are assembled in a horizontal direction.

2. Description of the Related Art

In general, an automotive transmission may be controlled to change the gear ratio to constantly maintain the rotational speed of an engine of a vehicle based on the speed of the vehicle, and a shift lever is provided in the vehicle for the driver to adjust the gear ratio of the automotive transmission.

The shift mode of the automotive transmission may be classified into a manual shift mode in which the driver manually adjusts the gear ratio of the automotive transmission and an automatic shift mode in which the gear ratio of the automotive transmission is automatically adjusted based on the speed of the vehicle when the driver selects the Drive (D) stage.

Further, there has been used a sports mode-type automotive transmission capable of implementing both a manual shift operation and an automatic shift operation in a single automotive transmission. In a sports mode, the manual shift mode is performed in response to the driver increasing or decreasing the gear stages, while the automatic shift mode is performed. The automatic shift mode generally provides gear stages including the Park (P) stage, which is for parking the vehicle, the D stage, which is for moving the vehicle forward, the Reverse (R) stage, which is for moving the vehicle backward, and the Neutral (N) stage, which is for disconnecting the output from the engine of the vehicle from being transmitted to the driving wheels of the vehicle.

Recently, a shift-by-wire system has been used, which transmits a manipulation signal resulting from a driver's manipulation of a shift lever via an electronic shift lever, instead of via a mechanical shift lever, and controls an automotive transmission in accordance with the manipulation signal.

Specifically, the shift-by-wire system is a system that controls the automotive transmission by transmitting the manipulation signal from the electronic shift lever to a transmission control device including an actuator, instead of transmitting the driver's manipulation of the shift lever to the automotive transmission via a mechanically connecting structure. In the case of using the electronic shift lever, the movement of the shift lever is detected by sensors, and a signal corresponding to a gear stage being selected is transmitted to a transmission control unit (TCU). Subsequently, the TCU changes gears by transmitting a control signal to the transmission control device, which is for controlling the gear position of an automatic automotive transmission. The transmission control device is also referred to as a transmission range control module (TRCM).

The shift-by-wire system, unlike a mechanical shift lever, does not have a mechanical cable connecting structure. In addition, the shift-by-wire system can facilitate shift lever manipulation, can provide an excellent feel of manipulation, and requires less space for a gear shift operation because it transmits the driver's manipulation of the shift lever as an electrical signal.

Meanwhile, in a rotary-type automotive transmission of related art, a bullet is configured to protrude from a shaft in a horizontal direction, and the shaft is coupled to a housing in a vertical direction. As a result, interference occurs between the bullet and grooves, and the bullet, which can be elastically fastened, requires to be pressed horizontally to be properly assembled to the shaft.

Thus, it is not only difficult, but also timing-consuming, to properly fasten the shaft to the housing because of the interference between the bullet and the grooves, and as a result, the efficiency of assembly may inevitably decrease.

SUMMARY

Exemplary embodiments of the present disclosure provide a rotary-type automotive transmission which is not only capable of preventing interference between a bullet part and groove parts when a shaft is fastened to a housing, but also capable of improving assemblability and a fastening force.

However, the present disclosure is not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, a rotary-type automotive transmission may include a housing; a shaft coupled to the housing in an axial direction; a bullet part provided on a surface of the shaft to be elastically projected in a first direction, which is perpendicular to the axial direction, and/or in a second direction, which is opposite to the first direction; and a groove part mounted in a receiving groove that is formed on a surface of the housing, to face the bullet part, wherein the groove part slidably moves in the first direction and/or in the second direction to be received in the housing.

The rotary-type automotive transmission may further include sliding members that guide slidable movement of the groove part to allow the groove part to be attached to, or detached from, the receiving groove. The sliding members may include guiding protrusions which are formed on inner sides of the receiving groove to protrude; and sliding grooves which are formed on sides of the groove part to be recessed. The guide protrusions may be received in the sliding grooves to be slidably movable.

The rotary-type automotive transmission may further include latch parts that fix the groove part in the receiving groove. The latch parts may include first snap-fit members which are provided on both ends of the groove part and include first inclined surfaces and first fixing surfaces, and second snap-fit members which are engaged with the first snap-fit members. The second snap-fit members may be provided at ends of the inner sides of the housing, and include second inclined surfaces and second fixing surfaces.

The rotary-type automotive transmission may further include a cover part that covers a top surface of the housing and is fixed to the housing; and fixing parts that fix the groove part when the cover part is mounted.

The fixing parts may include a coupling protrusion which protrudes in the axial direction on the inside of the cover part and an insertion groove which is formed in the groove part to correspond to the coupling protrusion. The coupling protrusion may be inserted into the insertion groove of the groove part According to the above and other exemplary embodiments, when the shaft and the housing are coupled, the bullet part, which is projected in the horizontal direction of the shaft, may be mounted on the surface of the housing first, and subsequently the groove part is coupled horizontally to the housing. Thus, the bullet part may be prevented from interfering with the groove part during assembly.

In addition, the groove part may be easily coupled to, and mounted in, the housing using a simple slide-coupling structure. Further, since the groove part may be fixed vertically by the slide-coupling structure and may also be fixed horizontally by a latch structure, the reliability of the coupling between the groove part and the housing may be improved.

Moreover, since the cover part is mounted on the shaft and on the housing, the groove part and the housing may be confined to each other, and as a result, the reliability of the coupling between the groove part and the housing may be further improved.

Other features and embodiments may be apparent from the following detailed description, the drawings, and the claims.

BRIEF DESCRIPTION OF THE DRAWINGS

The above and other exemplary embodiments and features of the present disclosure will become more apparent by describing exemplary embodiments thereof in detail with reference to the attached drawings, in which.

DETAILED DESCRIPTION

Figure 1:
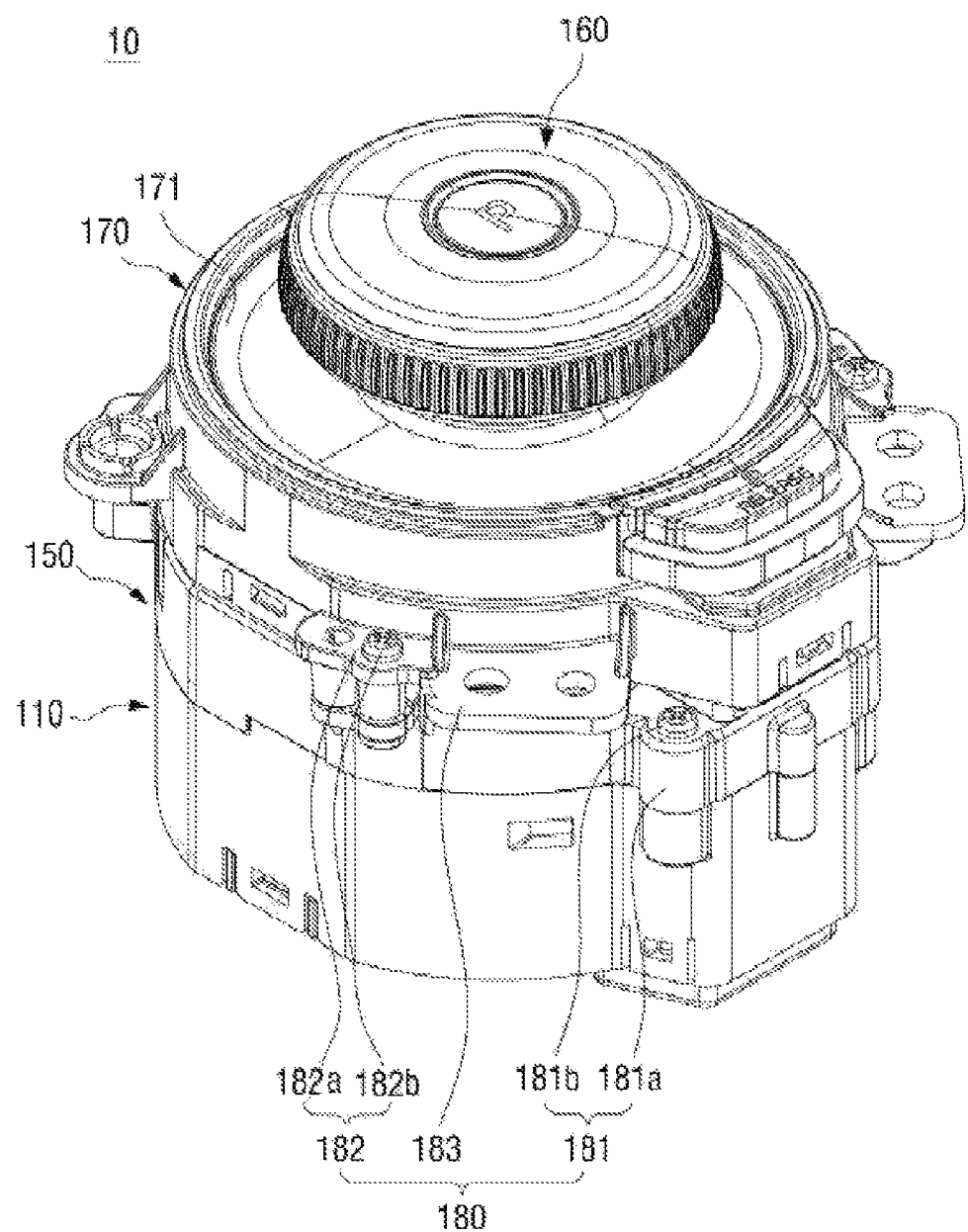
FIG. 1 is a perspective view of a rotary-type automotive transmission according to an exemplary embodiment of the present disclosure.

The aspects and features of the present disclosure and methods for achieving the aspects and features will be apparent by referring to the exemplary embodiments to be described in detail with reference to the accompanying drawings. However, the present disclosure is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures. Accordingly, in some exemplary embodiments, well-known processes, structures, and technologies are not described in detail since they would may obscure the disclosure in unnecessary detail.

In the following description of the present disclosure, the terms used are for explaining exemplary embodiments of the present disclosure, but do not limit the scope of the present disclosure. In the description, a singular expression may include a plural expression unless specifiically described. The term "comprises" and/or "comprising" used in the description means that one or more other components, steps, operation and/or existence or addition of elements are not excluded in addition to the described components, steps, operation and/or elements. Further, the term "and/or" includes each of mentioned items and all combinations of one or more of the items.

In the following description of the present disclosure, exemplary embodiments of the present disclosure will be described with reference to perspective views, plan views, sectional views, and/or side views, which are all ideal schematic views. The form of exemplary views may be modified due to the manufacturing techniques and/or allowable tolerances. Accordingly, the exemplary embodiments of the present disclosure are not limited to their specified form as illustrated, but may include changes in the form being produced according to manufacturing processes. In the drawings, sizes and relative sizes of layers and areas may be exaggerated for clarity in explanation. In the entire description of the present disclosure, the same drawing reference numerals are used for the same elements across various figures.

A rotary-type automotive transmission 10 according to an exemplary embodiment of the present disclosure will hereinafter be described with reference to the accompanying drawings.

Figure 2:
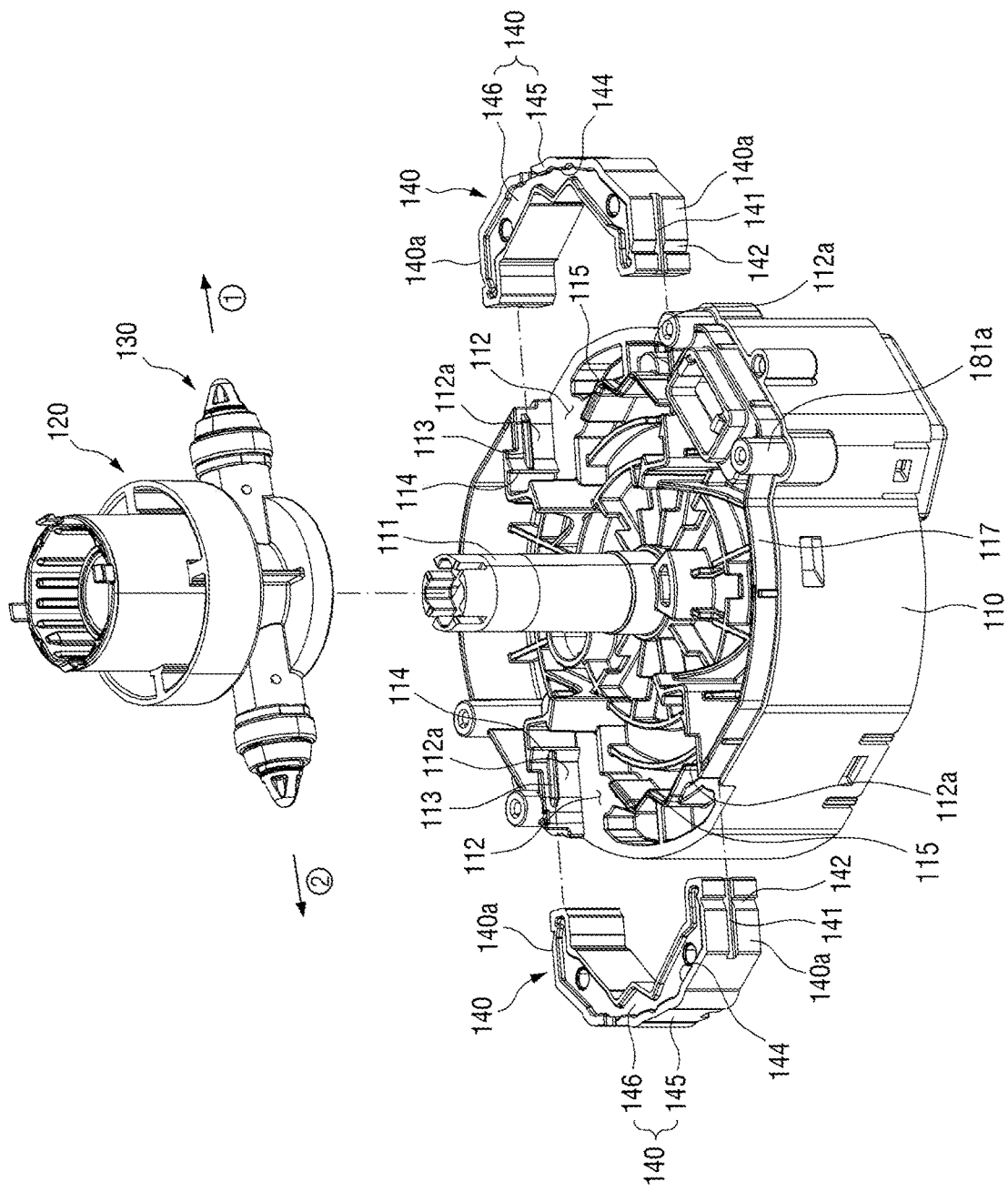
FIG. 2 is an exploded perspective view of the rotary-type automotive transmission according to an exemplary embodiment of FIG. 1.
Figure 3:
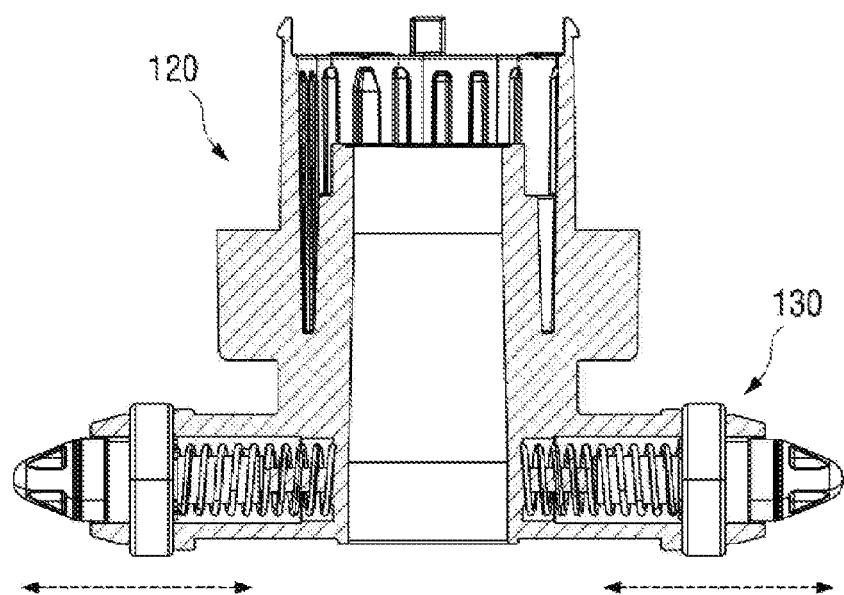
FIG. 3 is a schematic view illustrating a shaft of the rotary-type automotive transmission according to an exemplary embodiment of FIG. 1 and a bullet part provided in the shaft.

FIG. 1 is a perspective view of the rotary-type automotive transmission 10. FIG. 2 is an exploded perspective view of the rotary-type automotive transmission 10. FIG. 3 is a schematic view illustrating a shaft 120 of the rotary-type automotive transmission 10 and a bullet part 130 provided in the shaft 120. Referring to FIGS. 1 through 3, the rotary-type automotive transmission 10 may include a housing 110, the shaft 120, the bullet part 130, groove parts 140, and a cover part 150.

The housing 110 may have a cylindrical structure, and a rotary knob part 160 may be disposed at the top of the housing 110 to be rotatable. In the housing 110, an axial part 111, which protrudes (e.g., is projected) in an axial direction and is rotatably coupled to the rotary knob part 160, may be formed. Receiving grooves 112 in which the groove parts 140 are received may be formed to be opposite to each other with respect to the axial part 111 on inner sides 112a of the receiving grooves 112. The shaft 120 may be coupled to the axial part 111 in the axial direction and may thus be able to rotate by a predetermined angle in response to the rotation of the rotary knob part 160. The bullet part 130 may be provided at one surface of the shaft 120, particularly, at the bottom surface of the shaft 120. The bullet part 130 may be coupled to the bottom surface of the shaft 120 to be elastically projected in a first direction ①, which is perpendicular to the axial direction of the axial part 111, and in a second direction ②, which is the opposite direction of the first direction ①.

The groove parts 140 may be mounted in the receiving grooves 112 that are formed on a surface of the housing 110, and may be disposed to face the bullet part 130. The groove parts 140 may have a horseshoe shape to form at least part of the housing 110, which is substantially cylindrical in shape. The groove parts 140 may have elasticity, and when received in the housing 110 along the receiving grooves 112, both ends of each of the groove parts 140 may be elastically pressed, retracted, and restored, and as a result, the groove parts 140 may be slidably moved while being in close contact with the receiving grooves 112.

At least four recesses, i.e., first through fourth recesses 145a through 145d, may be provided on the inside of each of the groove parts 140, and as the rotary knob part 160 rotates, the bullet part 130 may also rotate and may thus be engaged with the first through fourth recesses 145a through 145d. The first through fourth recesses 145a through 145d may be engaged with the bullet part 130 to correspond to Drive (D)-, Reverse (R)-, and Neutral (N)-stage driving.

Each of the groove parts 140 may include a body 145 which forms a recessed surface as an inner circumferential surface thereof while forming a hollow 144, and a damping portion 146 which is inserted and engaged in the hollow 144 of the body 145. The outer circumference of the body 145 may be formed to have a predetermined curvature and thus to correspond to the cylindrical shape of the housing 110, and the inner circumference of the body 145 may form the first through fourth recesses 145a through 145d of the corresponding groove part 140, which may create a feel of a click (e.g., a detent feeling, a tactile feedback, an operational feeling, or a haptic response) for each gear stage by being engaged with the bullet part 130.

The bullet part 130 may be rotated while engaged with the first through fourth recesses 145a through 145d and may thus be elastically moved along, and received in, the first through fourth recesses 145a through 145d. In this case, noise or vibration may be generated due to the movement of the bullet part 130 and the friction and engagement of the bullet part 130 and the groove parts 140. Since the hollow 144 is formed in the body 145 and the damping portion 146 is provided, the generation of noise or vibration in the hollow 144 may be reduced.

The body 145 may include a material such as plastic, and the damping portion 146 may include a rubber material to absorb or decrease noise or vibration. However, the materials of the body 145 and the damping portion 146 are not particularly limited, but may vary, as long as they can provide the feel of a click, while decreasing noise or vibration, in response to the bullet part 130 being received in each of the first through fourth recesses 145a through 145d.

A recess supporting surface 115, which is capable of supporting the first through fourth recesses 145a through 145d, may be formed on the inside of each of the receiving grooves 112, in which the groove parts 140 are received, to correspond to the first through fourth recesses 145a through 145d. The first through fourth recesses 145a through 145d may form a W shape together, and the recess supporting surface 115 may be formed in a W shape to correspond to the shape formed by the first through fourth recesses 145a through 145d.

At least four grooves 145a through 145d may be formed in each of the groove parts 140. The four grooves 145a through 145d may be provided to be able to easily shift gears in response to the button of the rotary knob part 160 being pressed and released, and may implement different gear stages. Specifically, the R stage, an NR stage, an ND stage, and the D stage may be formed in a direction from one end to the other end of the array of the first through fourth recesses 145a through 145d. In other words, two recesses at either end of the array of the first through fourth recesses 145a through 145d, i.e., the first and fourth recesses 145a and 145d, may form temporary points R and D, respectively, for the R stage and the D stage, respectively, and fixed points Nr and Nd for the NR stage and the ND stage, respectively, may be formed between the temporary points R and D. In order to selectively limit the movement of the rotary knob part 160 from the current position thereof to another fixed point or temporary point, the first, second, third, and fourth recesses 145a, 145b, 145c, and 145d may be provided to correspond to the temporary point "R" for the R stage, the fixed point Nr for the NR stage, the fixed point Nd for the ND stage, and the temporary point D for the D stage, respectively.

For example, assume that the N stage is selected with the bullet part 130 received in the second recess 145b to be located at the fixed point Nr. In this example, if the bullet part 130 is moved to the first recess 145a by rotating the button of the rotary knob part 160, the bullet part 130 may return to the second recess 145b after being moved to the first recess 145a, due to elasticity. Consequently, even though the bullet part 130 returns to its original location and is received in the second recess 145b, gears may be shifted from the N stage to the R stage.

In the R stage with the bullet part 130 received in the second recess 145b, if the bullet part 130 is moved to the third recess 145c, the bullet part 130 may be moved from the fixed point Nr to the fixed point Nd, and gears may be shifted from the R stage to the N stage.

The N stage may be maintained with the bullet part 130 received in the third recess 145c and disposed at the fixed point Nd. If the bullet part 130 is moved from the third recess 145c to the fourth recess 145d by rotating the button of the rotary knob part 160, the bullet part 130 may return to the third recess 145c after being moved to the fourth recess 145d, due to elasticity. Consequently, even though the bullet part 130 returns to its original location and is received in the third recess 145c, gears may be shifted from the N stage to the D stage.

The state where the rotary knob part 160 is disposed at the fixed point Nr may be configured to be recognized not only as the state where the P stage is selected, but also as the state where the N stage or the R stage is selected, and the state where the rotary knob part 160 is disposed at the fixed point Nd may be configured to be recognized not only as the state where the P stage is selected, but also as the state where the N stage or the D stage is selected. In other words, the state where the rotary knob part 160 is disposed at the fixed point Nr may be recognized as the state where the P stage, the N stage, or the R stage is selected, and the state where the rotary knob part 160 is disposed at the fixed point Nd may be recognized as the state where the P stage, the N stage, or the D stage is selected.

During the assembly of the rotary-type automotive transmission 10, the groove parts 140 may be slidably moved and received in the housing 110 in the first direction ① or in the second direction ②. The cover part 150 of the rotary-type automotive transmission 10 may be disposed at the top of the housing 110 and may be coupled and fixed to the housing 110 in the axial direction to cover the bullet part 130, the groove parts 140, and the shaft 120, which are provided at the top of the housing 110. The rotary knob part 160 may be provided at the top of the cover part 150 to be exposed.

Specifically, the rotary knob part 160 may be provided on the cover part 150, and a bezel member (or accessary member) 170, which is mounted at the top of the cover part 150 and has a release button part while adding an aesthetic touch to the rotary-type automotive transmission 10, may be further provided on the cover part 150. The bezel member 170 may be mounted on, and coupled to, the cover part 150. The release button part may be provided at a predetermined location on the circumferential surface of the bezel member 170. The release button part may be an element for placing the shift lever of a vehicle in the P stage for safety reasons when the vehicle is not operated, but the rotary knob part 160 is yet to be placed in the P stage. The rotary knob part 160 may be provided at the center of the bezel member 170 to be rotatable. In addition, a light-emitting member 171 such as a light source or a waveguide may be disposed on the inner circumference of the bezel member 170 to emit light toward the rotary knob part 160 and thus to improve the aesthetics of the rotary-type automotive transmission 10.

A coupling part 180 may be provided. The coupling part 180 may be for coupling the housing 110 and the cover part 150, coupling the cover part 150 and the bezel member 170, and coupling the rotary-type automotive transmission 10, into which the housing 110, the cover part 150, and the bezel member 170 are assembled, to the vehicle. The coupling part 180 may include first, second, and third coupling portions 181, 182, and 183. In the first coupling portion 181, which is for coupling the cover part 150 and the housing 110, a first coupling member 181b such as a screw may be received by, and coupled and fixed to, a first coupling surface 181a that protrudes from the outer circumferences of the housing 110 and the cover part 150 to form a first coupling aperture. However, the structure of the first coupling portion 181 is not particularly limited, but may vary. For example, the first coupling portion 181 may have a snap-fit coupling structure.

The second coupling portion 182, which is for coupling the cover part 150 and the bezel member 170, may be disposed to be apart by a predetermined distance from the first coupling portion 181 to prevent interfering with the first coupling portion 181. In the second coupling portion 182, a second coupling member 182b such as a screw may be received by, and coupled and fixed to, a second coupling surface 182b that protrudes from the outer circumferences of the cover part 150 and the bezel member 170 to form a second coupling aperture. However, the structure of the second coupling portion 182 is not particularly limited, but may vary. For example, the second coupling portion 182 may have a snap-fit coupling structure. The third coupling portion 183, which is for coupling the rotary-type automotive transmission 10 to the vehicle, may be provided at a predetermined location on the outer circumference of at least one of the cover part 150, the housing 110, and the bezel member 170. The first, second, and third coupling portions 181, 182, and 183 may preferably be disposed at different locations to pervert interfering with one another.

Figure 4:
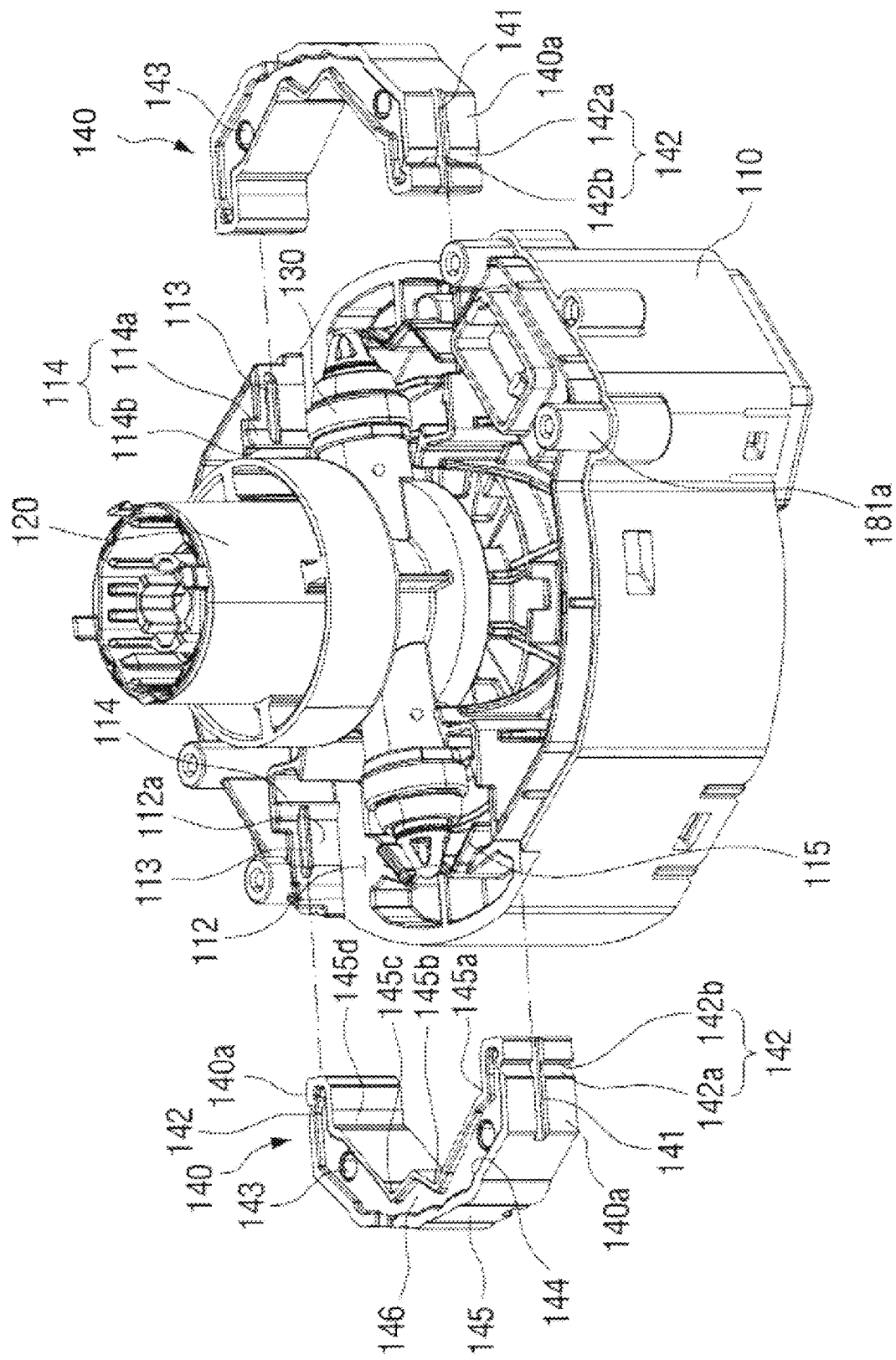
FIG. 4 is an exploded perspective view illustrating groove parts separated from a housing of the rotary-type automotive transmission according to an exemplary embodiment of FIG. 1.
Figure 5:
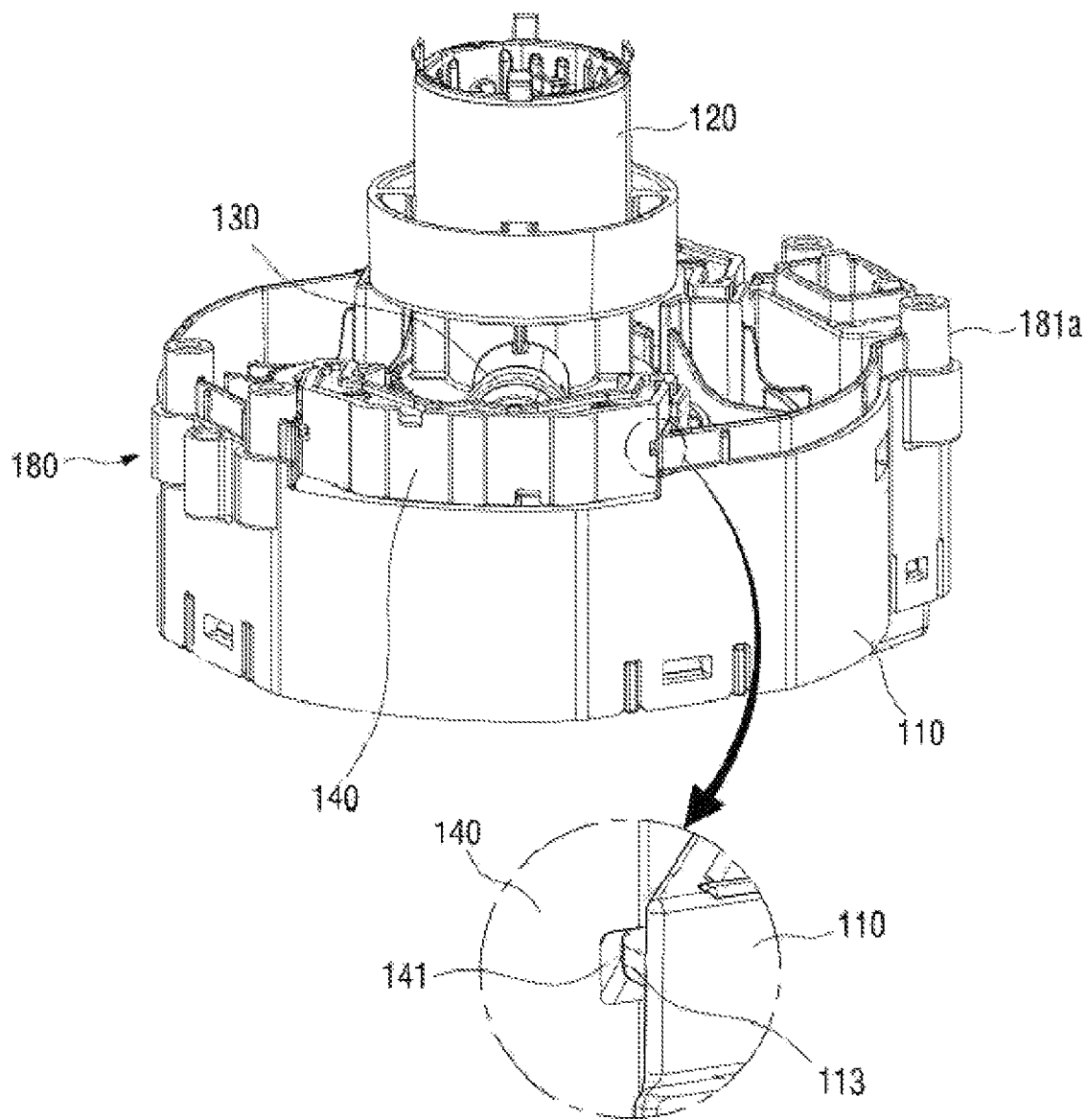
FIG. 5 is an enlarged perspective view illustrating the groove parts inserted in receiving grooves of the rotary-type automotive transmission according to an exemplary embodiment of FIG. 1 and also illustrating sliding members of the rotary-type automotive transmission according to an exemplary embodiment of FIG. 1.
Figure 6:
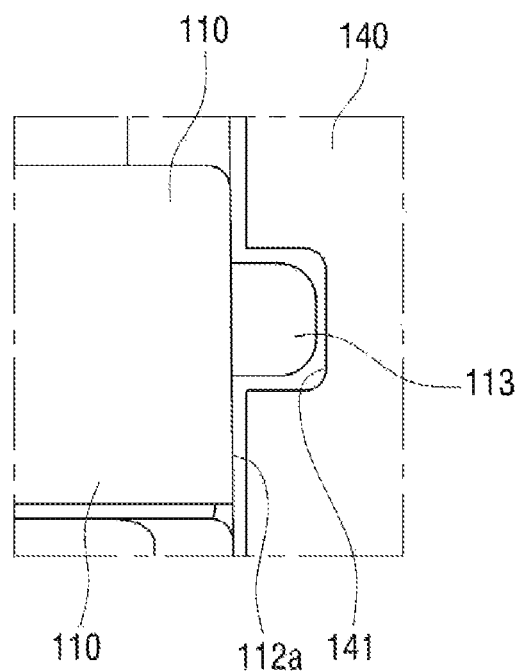
FIG. 6 is a schematic view illustrating the sliding members between the housing and the groove parts of the rotary-type automotive transmission according to an exemplary embodiment of FIG. 1.

FIG. 4 is an exploded perspective view illustrating the groove parts 140 separated from the housing 110 of the rotary-type automotive transmission 10. FIG. 5 is an enlarged perspective view illustrating the groove parts 140 that are inserted in the receiving grooves 112 and also illustrating sliding members 113 and 141. FIG. 6 is a schematic view illustrating the sliding members 113 and 141 between the housing 110 and the groove parts 140.

Referring to FIGS. 4 through 6, the sliding members 113 and 141, which may be slidably moved to attach the groove parts 140 to, or detach the groove parts 140 from, the receiving grooves 112 of the housing 110, may be provided between the housing 110 and the groove parts 140. Accordingly, during the assembly of the rotary-type automotive transmission 10, the shaft 120 with the bullet part 130 may be inserted into the axial part 111, and subsequently, the groove parts 140 may be assembled into the housing 110. The groove parts 140 may be slidably moved into the housing 110 in the first direction ① and/or in the second direction ② and may thus be received in the housing 110. While being engaged with the receiving grooves 112, the sliding members 113 and 141 may allow the groove parts 140 to be slidably moved in, and coupled to, the receiving grooves 112, and may prevent the movement of the groove parts 140 in the axial direction to allow the groove parts 140 to be fixed primarily.

The sliding members 113 and 141 may include guiding protrusions 113 and sliding grooves 141. The guiding protrusions 113 may be formed on the inner sides 112a of the receiving grooves 112 to protrude toward the groove parts 140. The guiding protrusions 113 may be formed to extend in a slidable moving direction, e.g., in the first direction ①. The sliding grooves 141 may be formed on sides 140a of the groove parts 140 to extend in the first direction ⓪ and to be recessed inwardly. Once the groove parts 140 are inserted in the receiving grooves 112, the guiding protrusions 113 may be received in the sliding grooves 141, and the sliding grooves 141 may become slidably movable along the guiding protrusions 113.

The guiding protrusions 113 may be formed in the housing 110, and the sliding grooves 141 may be formed in the groove parts 140. However, the present disclosure is not limited thereto. Alternatively, the sliding grooves 141 may be formed in the housing 110, and the guiding protrusions 113 may be formed in the groove parts 140. Further, the guiding protrusions 113 and the sliding grooves 141 may be disposed on the inner sides 112a of the receiving grooves 112 and on the sides 140a of the groove parts 140, respectively, but the locations of the guiding protrusions 113 and the sliding grooves 141 are not particularly limited, but may vary, as long as the slidable movement of the groove parts 140 may be properly guided with the groove parts 140 received in the receiving grooves 112, and at the same time, the groove parts 140 may be prevented from moving unnecessarily.

Although not specifically illustrated, the guiding protrusions 113 may be formed to have a wider cross section in a direction away from the inside of the receiving grooves 112, and the sliding grooves 141 may be formed to be wider in a direction closer to the inside of the groove parts 140. At least one sliding groove 141 and at least one guiding protrusion 113 may be provided. For example, a single sliding member 113 and 141 may be provided to correspond to each of the sides 140a of the groove parts 140 and each of the inner sides 112a of the receiving grooves 112. In another example, two parallel sliding members 113 and 141 may be provided. In other words, various modifications may be made to the structure and the number of sliding members 113 and 141.

Figure 7:
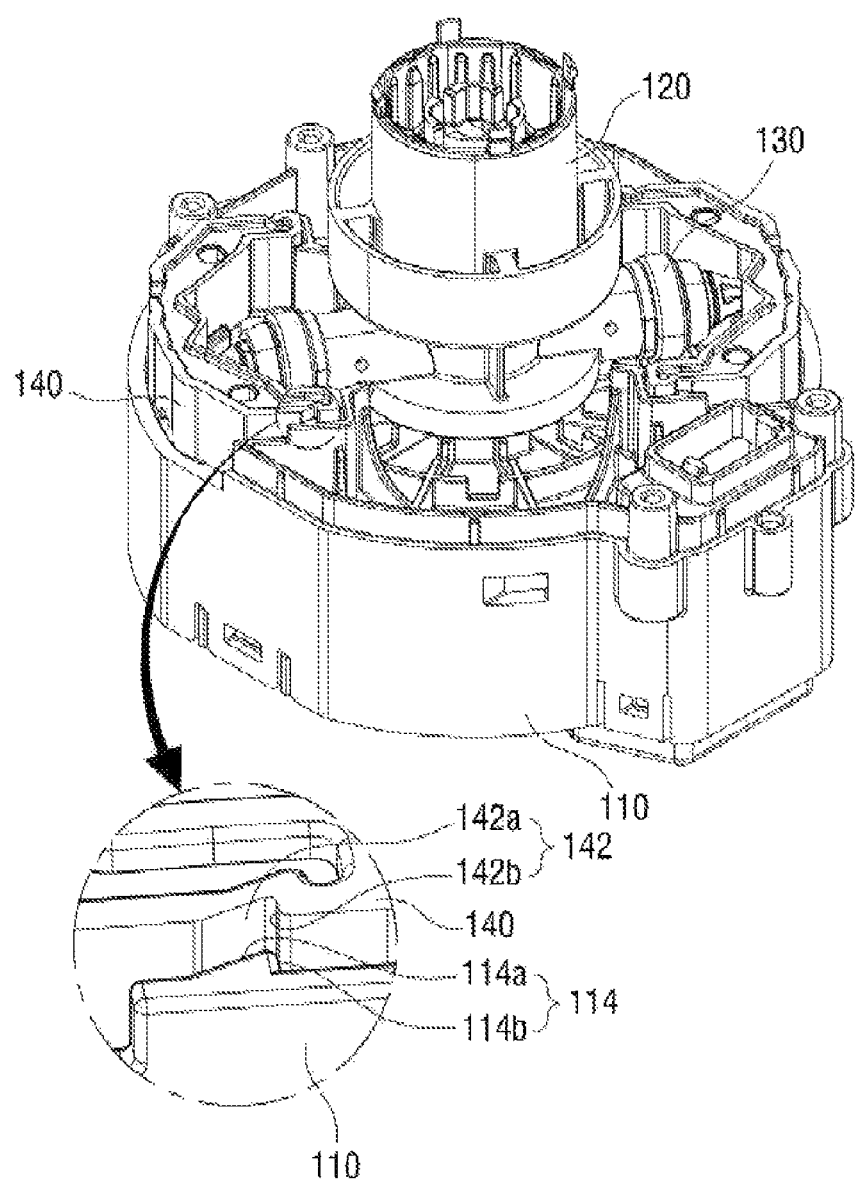
FIG. 7 is a perspective view illustrating latch parts of the rotary-type automotive transmission according to an exemplary embodiment of FIG. 1.
Figure 8:
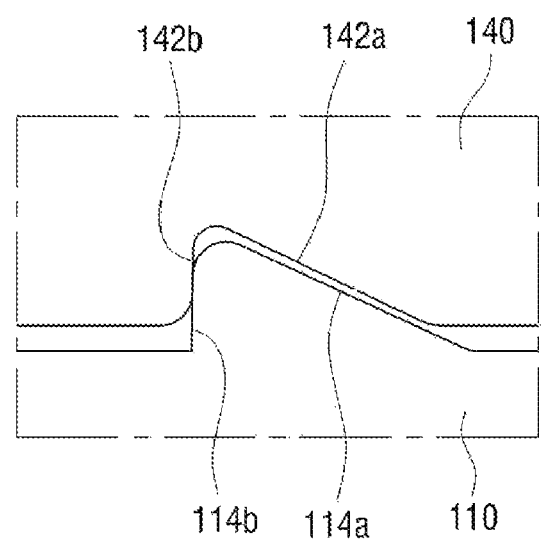
FIG. 8 is a schematic view illustrating the latch parts.

FIG. 7 illustrates latch parts 142 and 114 of the rotary-type automotive transmission 10. FIG. 8 is a schematic view illustrating the latch parts 142 and 114 of the rotary-type automotive transmission 10. Referring to FIGS. 7 and 8, the latch parts 142 and 114, which fix the groove parts 140 in the receiving grooves 112, may be further provided at the ends of the sliding members 113 and 141. The latch parts 142 and 114 may be formed in a direction perpendicular to the direction in which the sliding members 113 and 141 are mounted and may prevent the groove parts 140 from being detached from the housing 110 in the slidable moving direction. Accordingly, the sliding members 113 and 141 may prevent the groove parts 140 from moving in the axial direction, and the latch parts 142 and 114 may prevent the groove parts 140 from moving in the slidable moving direction (e.g., a traverse direction of the axial direction or a horizontal direction).

The latch parts 142 and 114 may include first snap-fit members 142 and second snap-fit members 114. The first snap-fit members 142 may be provided at both ends of each of the groove parts 140 and may include first inclined surfaces 142a and first fixing surfaces 142b. The second snap-fit members 114 may be provided on the inside of the housing 110. The second snap-fit members 114 may have a shape opposite to the shape of the first snap-fit members 142 and may thus be engaged with, and be fixed to, the first snap-fit members 142. The second snap-fit members 114 may include second inclined surfaces 114a and second fixing surfaces 114b, and the second fixing surfaces 114b may limit any movement in the slidable moving direction by being engaged with the first fixing surfaces 142b.

Figure 9:
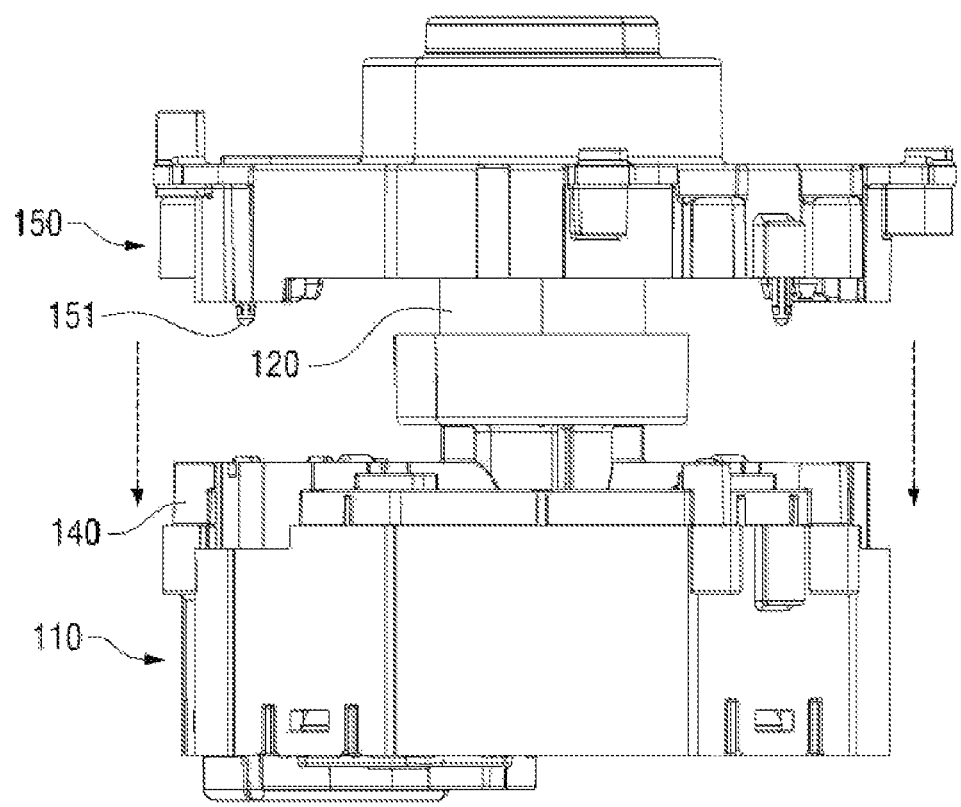
FIG. 9 is a side view illustrating the housing and a cover part prior to being coupled together.
Figure 10:
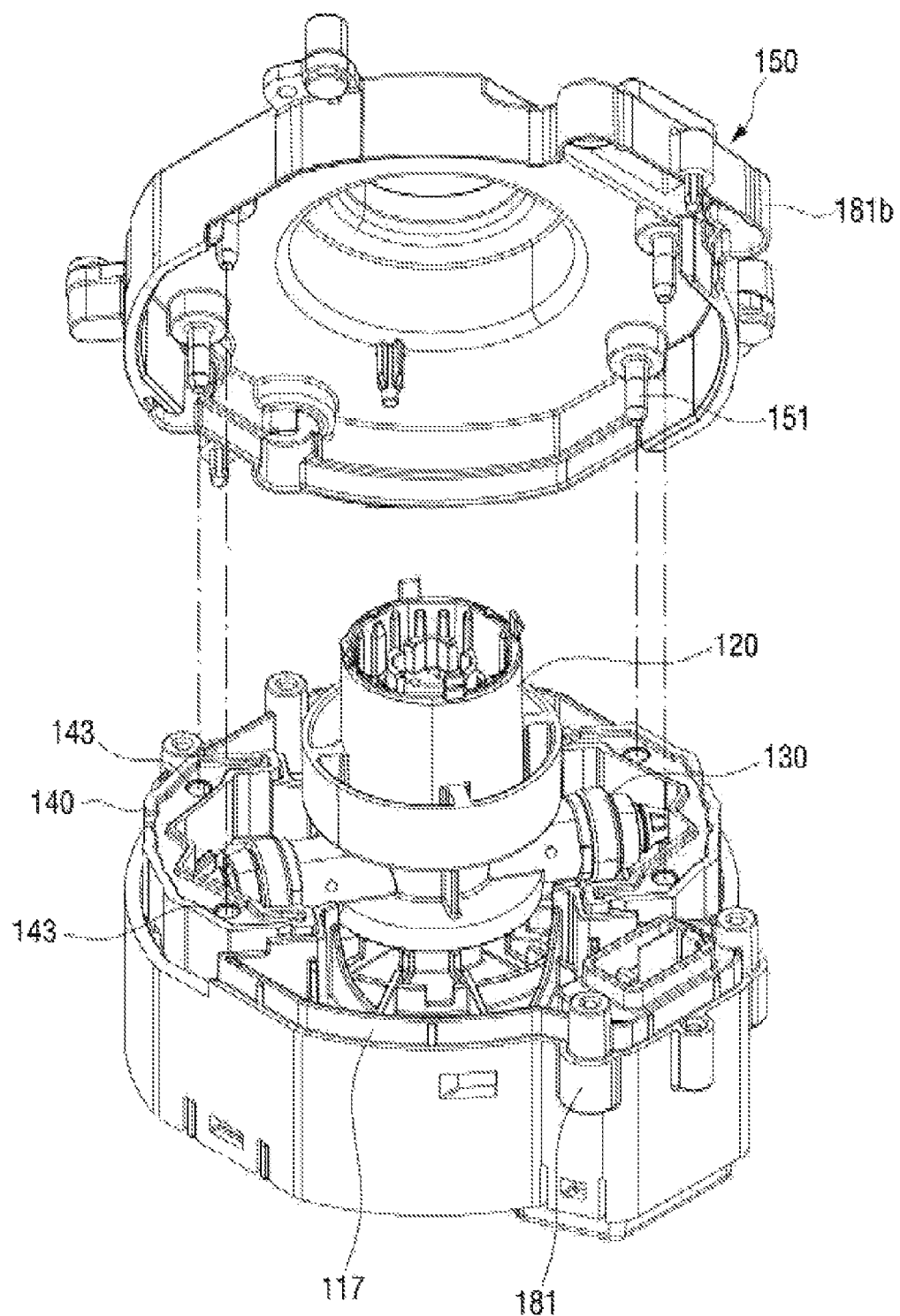
FIG. 10 is an exploded perspective view illustrating the housing and the cover part prior to being coupled together.

FIG. 9 is a side view illustrating the housing 110 and the cover part 150 prior to being coupled together. FIG. 10 is an exploded perspective view illustrating the housing 110 and the cover part 150 prior to being coupled together. Referring to FIGS. 9 and 10, the cover part 150 may be coupled to the housing 110 in the axial direction to cover the top surface of the housing 110, particularly, the bullet part 130, the groove part 140, and the shaft 120, which are provided at the top of the housing 110. The rotary knob part 160 may be provided on the top surface of the cover part 150 to be exposed.

The cover part 150 may be provided with separate coupling members to properly couple the bullet part 130, the groove part 140, and the shaft 120 while covering the top of the housing 110. In addition, fixing parts 151 and 154 may be further provided in the cover part 150 and the groove parts 140 to fix the groove parts 140 to the cover part 150 when the cover part 150 is mounted. The fixing parts 151 and 143 may include coupling protrusions 151 and insertion grooves 143. The coupling protrusions 151 may be mounted at locations that correspond to the locations of the groove parts 140 and may be projected from the inside of the cover part 150 in the axial direction.

The insertion grooves 143 may be formed in the groove parts 140 at locations that correspond to the locations of the coupling protrusions 151 and may be configured to receive the coupling protrusions 151. Once the cover part 150 is mounted on the housing 110 in the axial direction, the coupling protrusions 151 may be inserted and fixed in the insertion grooves 143. As a result, the groove parts 140 may be fixed in the receiving grooves 112 via the sliding members 113 and 141 and the latch parts 142 and 114. Further, since the coupling protrusions 151 are inserted in the insertion grooves 143, the groove parts 140 may be confined and fixedly coupled to the housing 110.

As described above, the rotary-type automotive transmission 10 may include a structure in which, prior to the groove parts 140 to be coupled into the receiving grooves 112, the shaft 120 with the bullet part 130 may be inserted in the axial part 111 first, and subsequently, the groove parts 140 may be inserted into the receiving grooves 112 by slidably moving in the first direction ① and/or in the second direction ②.

Accordingly, the ends of the bullet part 130, which are projected toward the groove parts 140, may be coupled to the housing 110 without interfering with the groove parts 140, and the groove parts 140 may be slidably moved and coupled into the receiving grooves 112 and may thus elastically push and fix the bullet part 130.

In addition, the groove parts 140 may be fixed in the axial direction by the sliding members 113 and 141 and may also be fixed in the slidable moving direction by the latch parts 142 and 114. Further, since the coupling protrusions 151 are fixed into the insertion grooves 143 by mounting the cover part 150 on the housing 110, the groove parts 140 may be confined to the housing 110.

While exemplary embodiments of the present disclosure are described above, it is not intended that these exemplary embodiments describe all possible forms of the invention. Rather, the words used in the specification are words of description rather than limitation, and it is understood that various changes may be made without departing from the spirit and scope of the inventive concept of the present disclosure. Additionally, the features of various implementing embodiments may be combined to form further embodiments of the inventive concept of the present disclosure.

What is claimed is:

1. A rotary-type automotive transmission comprising:
   a housing that includes a receiving portion formed on a side thereof;
   a shaft coupled to the housing in an axial direction;
   a bullet part provided on a surface of the shaft to be elastically projected in a first direction, which is perpendicular to the axial direction, and/or in a second direction, which is opposite to the first direction; and
   a groove part mounted in the receiving portion of the housing, to face the bullet part,
   wherein one of the receiving portion or the groove part includes at least one guiding protrusion that protrudes toward the other of the receiving portion or the groove part, and
   wherein the groove part is slidingly coupled to the receiving portion of the housing by being guided along the first direction and/or the second direction via the at least one guiding protrusion.

2. The rotary-type automotive transmission of claim 1, wherein the other of the receiving portion or the groove part includes at least one sliding groove formed to be recessed, and
   wherein the at least one guide protrusion is received slidingly in the at least one sliding groove along the first direction and/or the second direction.

3. The rotary-type automotive transmission of claim 2, further comprising:
   latch parts that fix the groove part in the receiving portion.

4. The rotary-type automotive transmission of claim 3, wherein the latch parts comprise:
   first snap-fit members provided on both ends of the groove part, wherein the first snap-fit members include first inclined surfaces and first fixing surfaces; and second snap-fit members configured to be engaged with the first snap-fit members, wherein the second snap-fit members are provided at inner ends of the receiving portion, and include second inclined surfaces and second fixing surfaces.

5. The rotary-type automotive transmission of claim 1, further comprising:
   a cover part that covers a top surface of the housing and is fixed to the housing; and
   fixing parts that fix the groove part when the cover part is mounted.

6. The rotary-type automotive transmission of claim 5, wherein the fixing parts comprise:
   a coupling protrusion that protrudes in the axial direction on an inside of the cover part; and
   an insertion groove formed in the groove part to correspond to the coupling protrusion, wherein the coupling protrusion is inserted into the insertion groove of the groove part.

* * * * *